April 7, 1925.

G. A. PEPLE, JR

STABILIZER

Filed June 23, 1922

Inventor
G. A. Peple, Jr
By Church & Church
His Attorneys

April 7, 1925.                                                1,532,939
G. A. PEPLE, JR
STABILIZER
Filed June 23, 1922            5 Sheets-Sheet 2
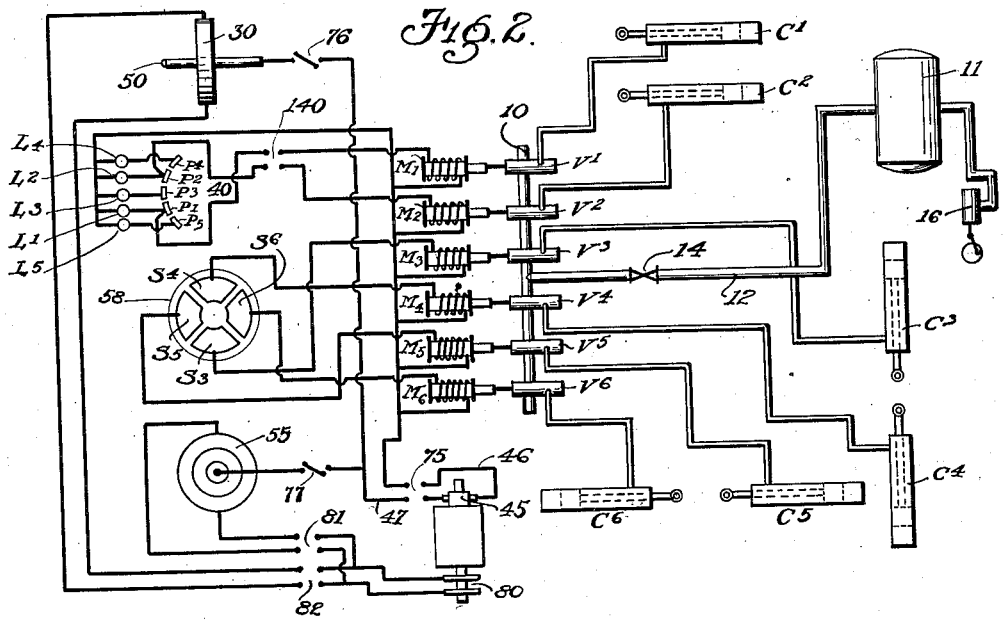
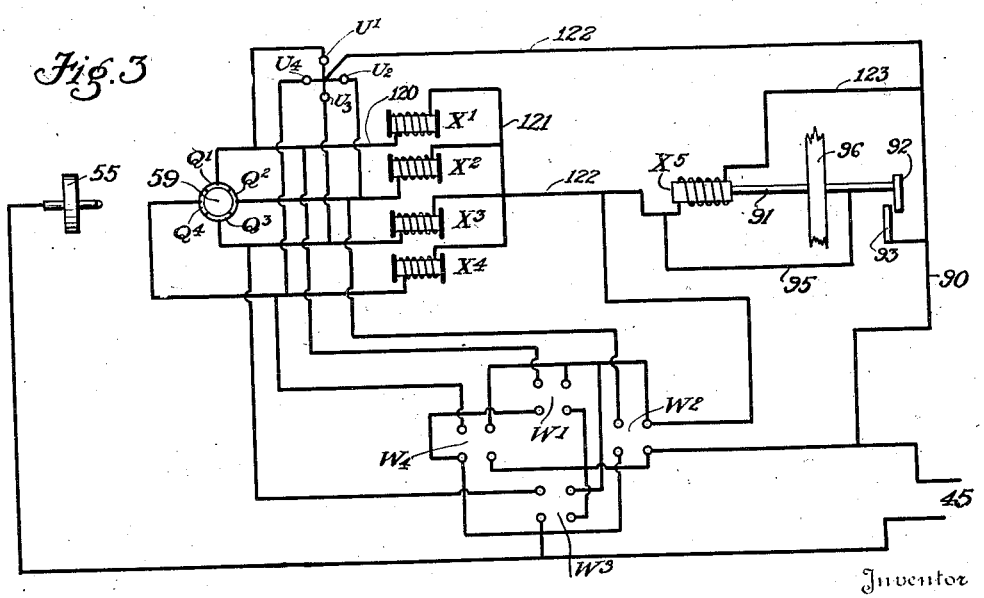

April 7, 1925. 1,532,939
G. A. PEPLE, JR
STABILIZER
Filed June 23, 1922 5 Sheets-Sheet 3

Inventor
G. A. Peple, Jr.
By Church & Church
His Attorneys

April 7, 1925.
G. A. PEPLE, JR
1,532,939
STABILIZER
Filed June 23, 1922
5 Sheets-Sheet 4
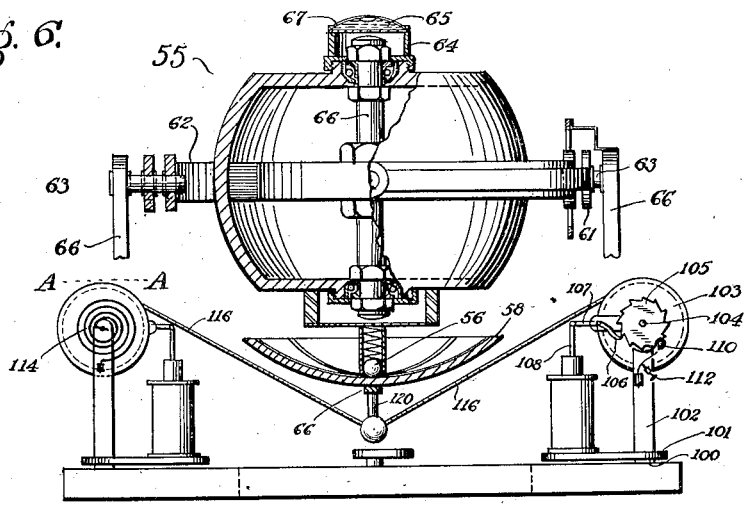
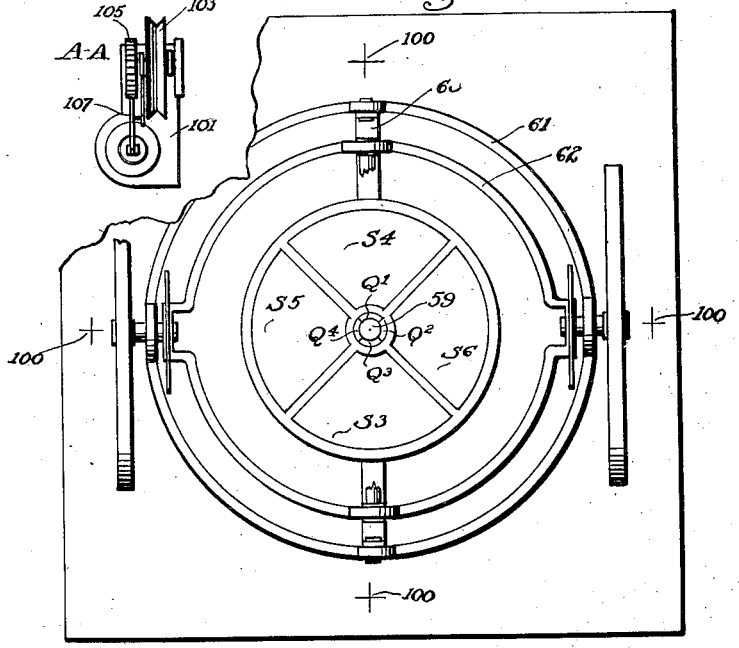

April 7, 1925. 1,532,939
G. A. PEPLE, JR
STABILIZER
Filed June 23, 1922 5 Sheets-Sheet 5

Inventor
G. A. Peple, Jr.
By Church & Church
Attorneys

Patented Apr. 7, 1925.

1,532,939

UNITED STATES PATENT OFFICE.

GUSTAVE A. PEPLE, JR., OF LYNCHBURG, VIRGINIA.

STABILIZER.

Application filed June 23, 1922. Serial No. 570,367.

*To all whom it may concern:*

Be it known that I, GUSTAVE A. PEPLE, Jr., a citizen of the United States, residing at Lynchburg, in the county of Campbell and State of Virginia, have invented certain new and useful Improvements in Stabilizers; and I do hereby declare the following to be a full, clear, and exact description of the same, reference being had to the accompanying drawings forming part of this specification.

This invention relates to an automatic control for airships and has for its principal object the general improvement of such devices.

The more important objects of the present invention in detail are the provision of various stabilizing means which are simpler than those now used and which may be cut in or cut out from the operator's seat at will, so that the operator may select a course and may then throw in one or more of the stabilizers to maintain that chosen course and may also be advised of variations from the course, as soon as they occur and before the automatic controls shall have operated. Other objects of the present invention will be apparent from the following description of the device and are specifically pointed out in the claims.

In the drawings,—

Fig. 2 is a wiring diagram, not including the wiring for the mechanism controlling the basin contact for the vertical axis gyroscope.

Fig. 3 is a wiring diagram of such wiring as is omitted from Fig. 2.

Fig. 6 is a vertical section of the vertical gyroscope.

Fig. 7 is a plan view thereof.

The steering controls are connected to pistons working within cylinders $C^1$ and $C^2$; the ailerons are connected to pistons in the cylinders $C^3$ and $C^4$; and the elevator controls are likewise connected to similar pistons working within the cylinders $C^5$ and $C^6$. Each of these six cylinders is controlled automatically by means of solenoid-operated valves all connected in parallel to a central distributing tube 10 receiving compressed air from main tank 11 through a pipe 12 having a regulating valve 14 mounted on the main panel within convenient reach of the operator, so that the latter may by merely closing the valve 14 throw the entire mechanical stabilizing devices here described out of operation while preserving the electrical signal devices in working order, subject also to being disconnected by means of switches within easy reach and as later described.

Figure 9:
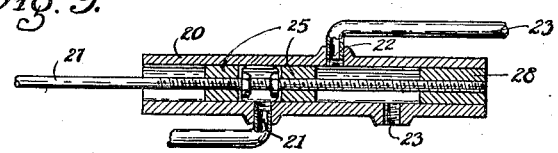
Fig. 9 is a section through one of the valves.

Air is delivered to the main tank 11 by means of a small compressor 16 driven in any desired manner, as, for example, from the main shaft of the airplane, and this compressor is regulated so as to maintain the pressure in the tank 11 at a fixed figure; fifty pounds per square inch being found satisfactory in practice. The valves $V^1$ to $V^6$ are alike and as shown in Fig. 9 are quite simple, consisting of a main tube 20 having three openings, opening 21 admitting air from the distributing tube, opening 22 delivering air to the cylinder, and exit 23 leading to the atmosphere. As illustrated in Fig. 9, the plunger 25 is in normal position preventing air from entering the cylinder which, as shown, is connected to the atmosphere through the exhaust opening 23. When one of the solenoids $M^1$ to $M^6$ is energized the rod 27 is pulled to the left in Fig. 9, which brings the stop 28 past the exit opening 23, closing the latter and moves the plunger 25 to the left of the inlet opening 21, thereby establishing communication between the distributing tank 10 and the control cylinder, the air then forcing the piston to the far end of the cylinder in each case. When the solenoid is deenergized, a spring (not shown) restores the solenoid armature and valve to the normal position shown in Fig. 9.

The gyroscope 30 revolves about a horizontal axis and is of the usual type in which the rotating element 31 is the rotor of an alternating current motor, the gyroscope being mounted in gimbal bearings, as is customary in the art. The bow or yoke 33 is secured to the base 34 by means of a short shaft 35 on which is mounted a sleeve 36 carrying a small sheave at the bottom and a plurality of curved arms 38 at the top these arms supporting the spherical-shaped contact member 40, which governs the steering control of the airplane through the solenoids $M^1$ and $M^2$.

The contact member 40 is composed of five parallel curved electrically conducting plates $P^1$ to $P^5$ insulated from one another and each connected to a lamp located on the operator's panel, lamps $L^1$ and $L^2$ preferably being green and indicating respectively left rudder and right rudder, lamps $L^4$ and $L^5$ being preferably red and signifying left and right, respectively, while the center lamp $L^3$ is white and signifies no change of course. The current to operate these lamps is derived from a generator such as 45, delivering current through wire 46 to the lamps and to the contact plates and delivering current through wire 47 to a brush 48 engaging a ring 49 on the gimbal mounting of the gyroscope from whence the current is conducted to a ball 50, preferably of silver, and carried within a tube on the gyroscope and adapted to contact selectively with the five plates on the member 40.

The gyroscope 55 which rotates about a vertical axis is similar in general construction and mounting to the horizontal axis gyroscope 30, also having a silver contact ball 56 which engages the spherical contact member 58, which consists of a number of conducting plates insulated from each other and spaced about a central insulating plug 59 normally engaged by the ball 56. The contacts are in two sets, plates $Q^1$ and $Q^4$ being relatively small, while plates $S^3$ to $S^6$ are much larger and form the major part of the basin which as shown is secured to a half ring 60 pivoted in the outer full ring 61 which like full ring 62 of the gyroscope is pivoted on shafts 63 thus furnishing a universal mounting for the spherical contact member or basin 58.

The gyroscope 55 at its top carries a small housing 64 supporting a spirit level 65 which facilitates the setting of the gyroscope 55 with its shaft 66 absolutely vertical, the center of the spherical cover glass 67 being positioned so as to lie within the axis of the rotor shaft 66.

The sectors $S^3$ to $S^6$ are connected to the solenoids $M^3$ to $M^6$, respectively, operating in the same manner as the solenoids $M^1$ and $M^2$ are operated. Thus when the silver contact ball 56 on the gyroscope 55 touches the sector $S^3$ the solenoid $M^3$ is energized, operating the valve $V^3$ to admit air to the cylinder $C^3$ thus acting on the ailerons to restore the plane to normal position; similarly, should the plane tilt to the other side the sector $S^4$ would connect solenoid $M^4$ with the generator operating valve $V^4$ and operating the ailerons through cylinder $C^4$. The sectors $S^5$ and $S^6$ also effect the balancing of the plane restoring it to level position after a slight nose up or nose down.

Current for each of the silver contact balls is conveyed from the generator through wire 47 and the double pole single-throw switch 75 on the instrument board the latter switch being provided so that the pilot may throw the entire signal equipment out of action. When he desires, however, the pilot may disconnect either of the gyroscopes without effecting the other by pulling one or the other of the switches 76 and 77 leading to the gyroscopes 30 and 55, respectively.

Current for operating the alternating current motor armatures constituting the fly wheels of the gyroscopes is furnished by the generator 80 delivering current to switches 81 and 82 which connect and disconnect the gyroscopes 55 and 30, the current in each case being conducted to brushes 84 and 85 having sliding contact with the rings 86 and 87 on the gyroscope mountings. I find it preferable to combine the direct current generator 45 and the alternating current generator 80 in a single instrument which, as illustrated, is a specially wound rotary converter driven directly by the internal combustion engine of the airplane. The various switches are all mounted on the instrument board within easy reach of the pilot so that the motor of either gyroscope may be disconnected at will, and the signal system operated by the two gyroscopes may also be disconnected at will and independently of the gyroscope source of power.

Figure 1:
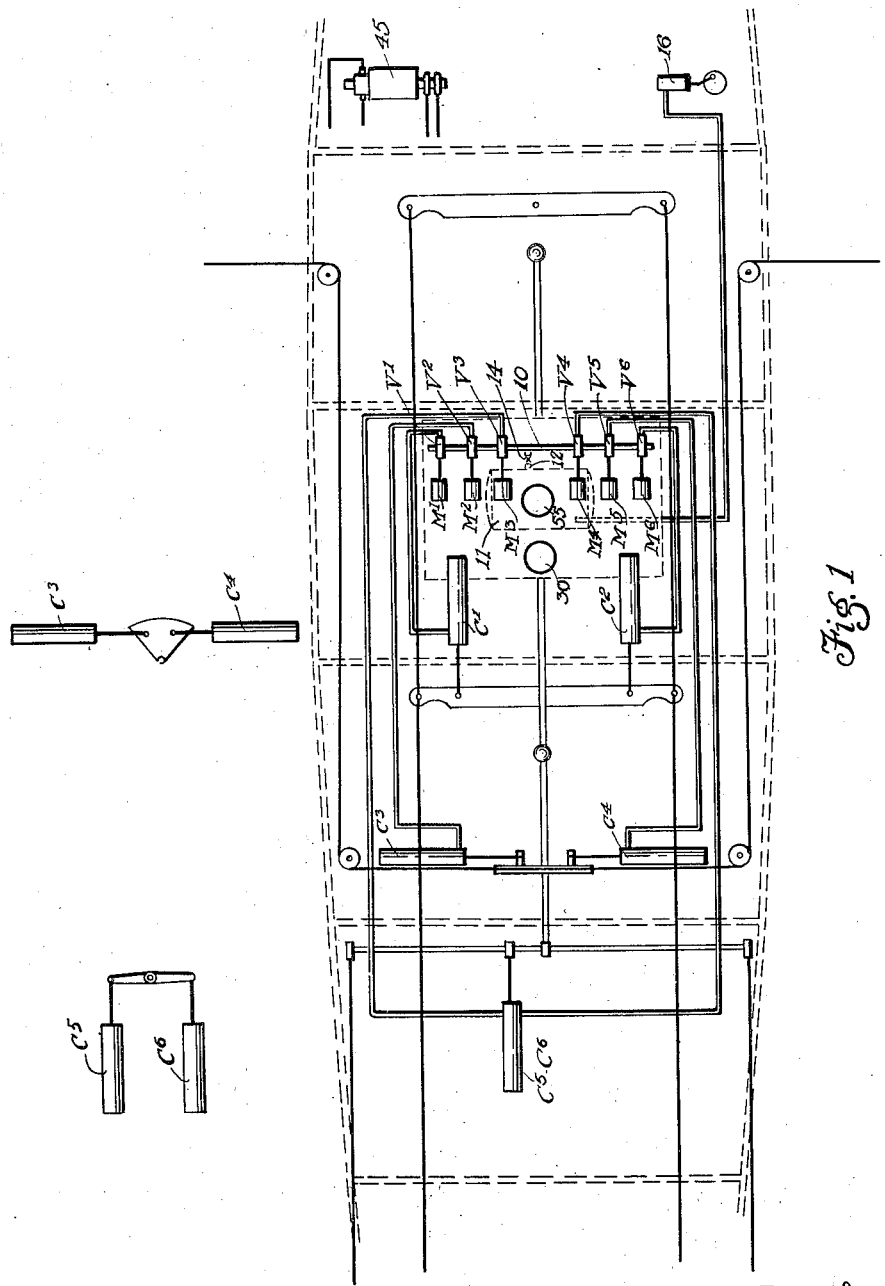
Figure 1 is a plan view of the fuselage of a plane with the controls indicated approximately in position.
Figure 4:
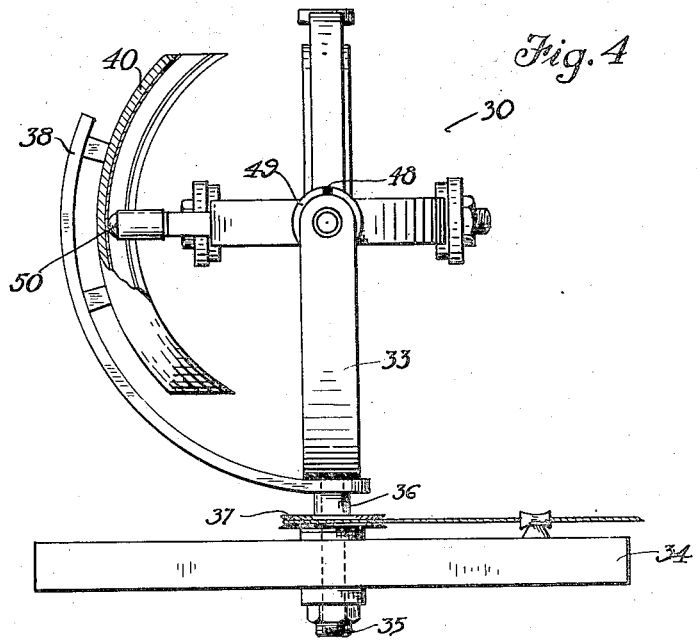
Fig. 4 is a side elevation of the horizontal axis gyroscope.
Figure 5:
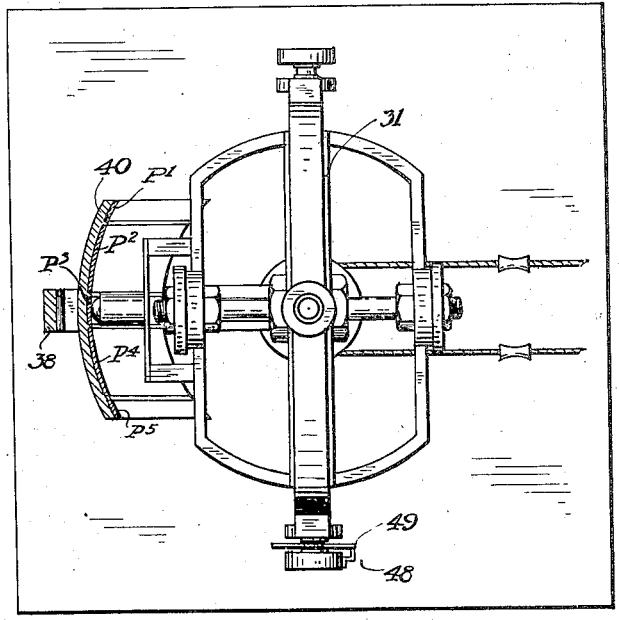
Fig. 5 is a plan view thereof.
Figure 8:
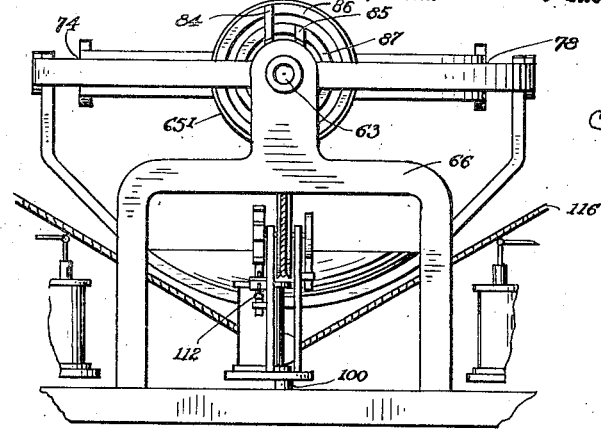
Fig. 8 is a rear elevation of the pivoted drum mechanism for controlling the position of the gimbal-mounted basin contact.

Referring particularly to Figs. 6, 7 and 8 the spherical contact member 58 which forms a basin-like structure is, as previously stated, freely movable, this provision being added in order to prevent the automatic stabilizing mechanism from elevating the nose of the plane after a long continued flight. The axis of the gyroscope at the beginning of flight is made vertical, but will naturally not remain vertical since according to its law it remains parallel to its initial position in space and without respect to the earth. After a flight of approximately 3,000 miles, for example, the airplane will have moved 45° over the surface of the earth and since the axis of the gyroscope is still parallel to its original position its axis will make an angle of 45° with a plane parallel to the earth's surface. If this were not compensated for, the stabilizing devices heretofore described would cause the plane to nose up 45° in order to bring the longitudinal axis of the airplane perpendicular to the shaft 66.

The quarter-zone contact members $Q^1$ to $Q^4$ are located adjacent to the non-conducting disk 59 and are insulated from each other and also from the surrounding sector contact members S³ to S⁶. Each of these contact members Q¹ to Q⁴ is connected respectively with solenoids X¹ to X⁴, the operating mechanism of which will be described later, all four of these solenoids being in a circuit which includes a fifth solenoid X⁵ connected to the generator 45 by wire 90.

The armature 91 of the solenoid X⁵ carries a contact member 92 adapted by engagement with the contact member 93 to short circuit the solenoid X⁵ and to connect one of the solenoids X¹ to X⁴ directly to the generator 45 through the shunt wire 95. A deferred action or time controlled valve 96 is connected to the armature 91 of the solenoid X⁵ and is timed to delay contact between 92 and 93 until after the expiration of a period of, say, twenty seconds in order that the mechanism controlled by solenoids X¹ to X⁴ shall not be operated by slight fluctuations of the plane.

The mechanisms controlled by the solenoids X¹ to X⁴ are exactly similar, consisting of a pivot 100 carrying a base 101 on which the solenoid is mounted to one side of uprights 102 rotatably carrying a drum 103 fixed to a shaft 104 which carries to one side of the upright 102 a ratchet wheel 105 operated by a pawl 106 on an arm 107 pivoted to the shaft 104 and also pivotally connected to the armature 108 of the solenoid. A spring pressed pawl 110 restrains the ratchet wheel 105 and its strength may be adjusted by the screw 112 as may be desired. A spiral spring 114 is connected to the shaft 104 and to the upright 102 and tends to wind the cord 116 on the drum 103 against the tension exerted by the spring pressed pawl 110, the spring 114, however, not being strong enough to wind the drum without aid from the solenoid.

When the silver ball 56 makes contact with the contact member Q¹, for example, current flows through the wire 120 of the solenoid X¹ thence through the wires 121, 122, to the solenoid X⁵ and from thence by the wire 123 to the wire 90 connected to the generator. The solenoid X⁵ starts to act at once but the current through the coils of the solenoids X¹ is not sufficient to operate it until such time as the resistance in the windings of the solenoids X⁵ and in the wire 123 is eliminated by the cutting out of this portion of the circuit by contact of members 92 and 93.

As soon as X¹ is connected directly to the generator 45, that is, after the expiration of the required twenty seconds, the armature 108 is drawn down and the drum 103 is rotated a twenty-fourth of a turn by means of the pawl 105 thus taking up the cord 116 on the drum 103 and shifting the insulating disk 59 back into contact with the silver ball 56. The effect of this is to pull the post 120 depending from the half ring 60 toward the solenoid which is being operated. This will draw cord from each of the other three drums against the tension of the spring pressed pawl 110 on such drums. Each of the solenoid armatures is provided with a spring (not shown) to restore the armature to normal position as is customary and the pawl 106 acts only on downward stroke of the arm 107.

In consequence of this action the center of the spherical contact member 58 will be maintained in the axis of the gyroscope, thus permitting, without further setting of the instruments, flights very much greater than have ever been attempted so far. If the plane swings for a slight period of time up or down or to the right or to the left for a period of but a few seconds or if the plane swings through a large angle, contact will be made with the smaller contact members but will have no effect due to the delayed action member 96, but upon making contact with the sector members the response will be practically instantaneous.

I find it convenient to supplement the flight controlling contact members with lights and switches placed on the instrument board, these devices being illustrated only in Fig. 3. The contact members Q¹ to Q⁴ are connected to the lights U¹ to U⁴ and also to switches W¹ to W⁴ so that when the plate Q², for example, is in contact with the silver ball 56 current not only flows through the solenoids X² and X⁵ but also flows through the lamp U² and the wire 122 to wire 90 connected to the generator, thus causing the lamp U² to burn. In case that the operation of the mechanism controlled by solenoid X² has not been sufficient to bring the insulating disk 59 in contact with the silver ball the continued burning of the light U² will notify the pilot that such condition exists, whereupon he may close the switch W² which will instantly operate the mechanism controlled by the solenoid X², the current in this case shunting the solenoid X⁵ as will be seen from the wiring diagram. These switches W¹ and W⁴ are also convenient for enabling the pilot to set the plane at any chosen angle by repeated energizing of the appropriate solenoids.

On the operator's panel 130 is mounted a mariner's compass chart 131 through the center of which passes a shaft 132 having on one end a hand wheel 133 and on the other end a sleeve 134 carrying an endless rope 135 which is guided through idler sheaves (not shown) to the sheave 37 on the sleeve 36. This mechanism enables the pilot to ascertain the course by turning the hand wheel 133 until the lamp is lit at which time he may read the course by observing the relative positions of pointer 138 and the marker 130

N on the hand wheel. If the axis of gyroscope 30 is pointing due north (silver ball 50 due south) and said axis is parallel to the fore and aft axis of the plane, N on hand wheel 133 will be opposite pointer 138 and lamp $L^3$ is lit. The pilot may also set his course by means of the pointer and may manually bring the plane to position so that the lamp $L^3$ will burn at which time the plane is in the course set. It is to be understood that as sheave 37 turns, the sleeve 36, yoke 33, curved arm 38, and contact members 40 turn with it.

Figure 10:
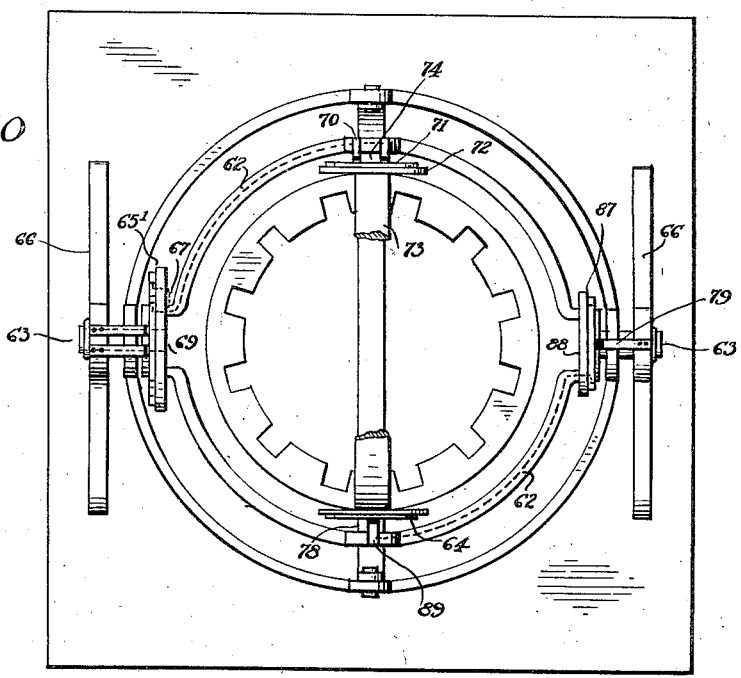
Fig. 10 is a diagram of the gyroscope wiring.

Referring now to Fig. 10 showing the method of conveying current to the motors and contact ball: The insulating disk 65' is fixed on the hollow shaft 63, the shaft 63 being mounted in the bearing of support 66. On the insulating disk 65' are mounted two copper rings 86 and 87. Brush 84 is mounted on and insulated from support 66. Electrical connection is established to the stator of the motor through brush 84, copper ring 86, wire 67 which passes through insulating disk 65' twice in order to get around ring 87, through hollow shaft 63 to hole 69, then along gimbal ring 62, to brush 70. Brush 70 is in contact with copper ring 71 which is mounted on insulating disk 72, the latter being fixed to ring 73. Ring 73 is fixed to the stator laminations and carries the bearings for the gyroscope. Ring 73 is mounted in the gimbal 62 at the bearings 74 and 78. From copper ring 71 a wire direct to stator winding (not shown) carries the current. From brush 79, through 87, hollow shaft 63, hole 88 (opposite from 69) current flows through wire on under side of gimbal ring 62 to brush 89 (diametrically opposite brush 70), through ring 64 to the other side of the stator winding.

The operation of the device briefly stated is as follows: Before the flight is started the gyroscope 55 is set by means of the spirit level 65 in a perfectly vertical position and the gyroscope 30 is set with its axis in a north and south line. The pilot after ascending and choosing his course in the usual manual manner closes all electric switches except 81 and 82 which were closed and are kept closed throughout the flight.

The spherical contact member for the vertical axis gyroscope is then pulled into position by operation of the appropriate switches $W^1$ and $W^4$ until such time as the silver ball on the gyroscope 55 is in contact with the nonconducting member 59 and when the contact element 40 is set by the hand wheel 133 to the proper course which, if the airplane is already in such course, will bring the central contact element $P^3$ in contact with the silver ball 50 which will cause the light $L^3$ to burn signifying adherence to the course. The control of the airplane is now entirely automatic.

Should the airplane veer up or down, to the right or to the left, or should it tilt to one side or the other, the contact members $L^1$ or $L^2$ or the sector members $S^3$ to $S^6$ or possibly one of each set will be brought into contact with the silver ball of the respective gyroscopes and will energize one or more of the solenoids $M^1$ to $M^6$ operating the steering control and the ailerons or the elevator mechanism as the case may be, which will right the airplane at once and will bring the contact ball of the vertical axis gyroscope into contact with the insulating member 59 and will bring the contact ball on the horizontal axis gyroscope into contact with the central contact member $P^3$ causing the lamp $L^3$ to burn.

This action will be repeated until such time as the continued flight of the plane has caused the axis of gyroscope 55 to make an appreciable angle with the vertical. At such time the silver ball of the gyroscope 55 will be brought in contact with one of the members $Q^1$ to $Q^4$ which will have no effect on the course of the airplane, but will bring the non-conducting member 59 into line with the axis of the gyroscope 55 preventing the stabilizer mechanism from causing the airplane to nose up as would be the case if the elements $Q^1$ and $Q^4$ were omitted.

Should it be desired to change the course at any time the switch 140 is opened throwing the solenoids $M^1$ and $M^2$ out of operation while still leaving the lights $L^1$ to $L^6$ in circuit. After the new course has been reached the pilot sets such course by means of the hand wheel 133 if the course is in accordance with the compass or if the course is chosen in accordance with some object on earth irrespective of the compass course the pilot turns the hand wheel 133 until the light $L^3$ shows, whereupon he closes the switch 140 and makes the stabilizing and guiding of the plane entirely automatic.

What I claim is:

1. In an airplane stabilizer, a gyroscope, a contact element carried by the shaft of said gyroscope, a plurality of contact plates adapted to engage with the contact element of said gyroscope and movable in any direction with respect to said element, a source of current connected with each of said plates and with said contact element, and a plurality of separate means, one in circuit with each of said plates for altering the position of said plates.

2. In a stabilizing and balancing device for an airplane, a gyroscope having a substantially vertical axis, a contact element carried by the shaft of said gyroscope, a support beneath said shaft and movable in any direction with respect thereto, a plurality of contact plates carried by said support in a zone shape, and means in circuit with said plates and said contact element for moving said support with respect to said contact element.

3. In a stabilizing device, a gyroscope having a substantially vertical axis of revolution, a ball yieldingly carried by said gyroscope, a support having an insulating disk and having a plurality of contact plates insulated from each other and positioned to form a ring surrounding said insulated disk, a solenoid for each contact plate, a source of current connected to said ball and to each of said solenoids, and means operated by said solenoids for bringing said insulated disk into contact with said ball upon the establishment of contact between said ball and any one of said plates.

4. In an airplane stabilizing device, a gyroscope, a contact element carried by said gyroscope, a contact member movable in any direction with respect to said gyroscope, and means for moving said contact member with respect to said contact element.

5. In an airplane stabilizing device, a gyroscope, a contact element carried thereby, a spherical-shaped contact member comprising a series of zone-shaped conducting plates insulated from each other and a support carrying the same, a plurality of lamps in circuit respectively with said contact element and one of said conducting plates, and means in circuit with certain of said plates for operating the rudder when said plates are brought into engagement with said contact element.

6. In an airplane stabilizing device, a gyroscope, a contact element carried by said gyroscope, a pivotally mounted support, means for manually altering the position of said support at will, a plurality of zone shaped conducting plates carried by said support, a lamp in circuit with each of said plates and with said contact element, a plurality of rudder controlling solenoids in circuit with certain of said plates, and means for disconnecting said solenoids without altering the operation of said gyroscope or said lamps.

7. In an airplane stabilizing device, a plurality of gyroscopes, a plurality of signal mechanisms controlled by said gyroscopes and a generator for delivering alternating current to said gyroscopes and delivering direct current to said signals.

8. In an airplane stabilizing device, a gyroscope having a normally horizontal axis, a plurality of rudder controlling solenoids operatively connected to said gyroscope, a second gyroscope having a normally vertical axis, a plurality of solenoids operatively connected to said second gyroscope, a plurality of signal means controlled by the relative position of the first mentioned gyroscope, and means for rendering inoperative said solenoid mechanism independently of said signal mechanism.

9. In an airplane stabilizing mechanism, a gyroscope, a contact element carried thereby, a contact member comprising a support and a plurality of conducting members arranged in the form of a portion of a sphere, a non-conducting member surrounded by said conducting members, certain of said conducting plates being connected to the balancing controls of the airplane and certain others of said conducting members governing the position of said support.

10. In an airplane stablizing device, a spherical support, contact members thereon, a contact element adapted to engage with any one of said contact members, a drum, flexible means connecting said drum and said support, a solenoid connected to said drum to wind said flexible means thereon and an electric circuit connecting said solenoid with one of said contact members so that upon engagement of said contact element with said contact member said support will be drawn toward said drum.

11. In an airplane stabilizing device, a plurality of contact members, a solenoid in circuit with each of said members, an additional solenoid, a retarding element delaying the operation of said additional solenoid, a source of power connected to said first mentioned solenoids through said additional solenoid, and means controlled by said retarding element for shunting said additional solenoid and allowing the full current to pass through one of said first mentioned solenoids.

12. In a device for stabilizing airplanes and for correcting for the curvature of the earth as the relation between a perpendicular dropped to the earth and the axis of the gyroscope changes during long flights, a contact element, a non-conducting member normally in engagement with said contact element, a plurality of spaced and insulated contact plates adapted to be engaged in turn by the contact element, means connected to one of said contact plates for altering the position of a balancing control of the airplane, means carried by the intermediate contact plate for altering the position of the outer contact plate and a delayed action mechanism in circuit with the intermediate contact plate for preventing operation of the means connected with said intermediate plate as said contact element swings from said non-conducting member over the intermediate member to the outer contact plate.

13. In a stabilizing gyroscope, a gyroscope, a gimbal therefor, a spherical contact member, a yoke supporting said member, a ring pivotally mounted concentric with the outer member of said gimbal, said ring pivotally supporting said yoke, and means for moving said yoke and ring.

GUSTAVE A. PEPLE, Jr.